United States Patent
Ida et al.

(10) Patent No.: US 7,887,993 B2
(45) Date of Patent: Feb. 15, 2011

(54) OPTICAL INFORMATION RECORDING MEDIUM AND RECORDING METHOD THEREOF

(75) Inventors: Keiichi Ida, Tokyo (JP); Daisuke Morishita, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 656 days.

(21) Appl. No.: 11/664,298

(22) PCT Filed: Sep. 30, 2005

(86) PCT No.: PCT/JP2005/018112

§ 371 (c)(1),
(2), (4) Date: Jan. 17, 2008

(87) PCT Pub. No.: WO2006/035929

PCT Pub. Date: Apr. 6, 2006

(65) Prior Publication Data

US 2008/0253274 A1    Oct. 16, 2008

(30) Foreign Application Priority Data

| Sep. 30, 2004 | (JP) | ............................. 2004-287209 |
| Sep. 30, 2004 | (JP) | ............................. 2004-287210 |
| Dec. 28, 2004 | (JP) | ............................. 2004-382051 |
| Dec. 28, 2004 | (JP) | ............................. 2004-382052 |
| Dec. 28, 2004 | (JP) | ............................. 2004-382053 |

(51) Int. Cl.
*G11B 7/24* (2006.01)

(52) U.S. Cl. ................. 430/270.15; 430/945; 428/64.8; 369/288; 369/284

(58) Field of Classification Search ........................ None
See application file for complete search history.

(56) References Cited

U.S. PATENT DOCUMENTS 4,837,063 A    6/1989   Irie (Continued)

FOREIGN PATENT DOCUMENTS

EP    1180765 A1    2/2002

(Continued)

OTHER PUBLICATIONS

Ya et al. "Phthalones and their structural analogues", Chem. Heterocy. Comp., vol. 11(4) pp. 381-395 (Apr. 1975).*

(Continued)

*Primary Examiner*—Martin J Angebranndt
(74) *Attorney, Agent, or Firm*—Birch, Stewart, Kolasch & Birch, LLP

(57) ABSTRACT

To provide an optical information recording medium including a pigment appropriate for high-density and high-speed optical recording by the blue laser light of 350 to 500 nm and especially around 400 nm (for example, 405 nm), enabling recording at low power, suppressing thermal affect of recording to the optical recording layer, and assuring a reflection ratio or modulation degree by the change of a refraction index n and an attenuation coefficient k; and to provide a recording method thereof.

Instead of the recording based on the optical phase difference obtained by a change Δn of the refraction index n of the pigment as in the conventional method, a pigment capable of performing recording based on the change ?k of the attenuation coefficient k has been obtained. Recording may be performed mainly by the change Δk of the attenuation coefficient k. It is preferable to use a recording wavelength which is at the side of longer wavelength than the absorption peak of the absorption spectrum for the laser beam of the aforementioned pigment. However, the invention is not to be limited to this and characterized in recording performed by the change of the attenuation coefficient of the pigment against the recording wavelength.

31 Claims, 8 Drawing Sheets wherein $R_1$, $R_2$, $R_3$ and $R_4$ are individually hydrogen atom or a substituent group.

U.S. PATENT DOCUMENTS

| | | | |
|---|---|---|---|
| 5,672,462 A * | 9/1997 | Takuma et al. | 430/270.15 |
| 6,319,581 B1 * | 11/2001 | Tamura | 428/64.1 |
| 6,359,150 B1 | 3/2002 | Fukudome et al. | |
| 6,693,201 B1 | 2/2004 | Rentzepis et al. | |
| 2005/0208425 A1 | 9/2005 | Ogiso et al. | |
| 2007/0054084 A1 * | 3/2007 | Shiozaki et al. | 428/64.4 |

FOREIGN PATENT DOCUMENTS

| | | | |
|---|---|---|---|
| EP | 1 445 115 A1 | | 8/2004 |
| EP | 1 672 626 A1 | | 6/2006 |
| JP | 2001-160240 | * | 6/2001 |
| JP | 2002-121459 A | | 4/2002 |
| JP | 2002-137547 A | | 5/2002 |
| JP | 2003-223740 A | | 8/2003 |
| JP | 2003-331465 A | | 11/2003 |
| JP | 2004-142131 A | | 5/2004 |
| JP | 2004-167694 A | | 6/2004 |
| JP | 2004-202972 A | | 7/2004 |
| JP | 2004-216714 A | | 8/2004 |
| JP | 2004-276481 A | | 10/2004 |
| JP | 2005-199569 A | | 7/2005 |
| WO | WO-03/035407 A1 | | 5/2003 |

OTHER PUBLICATIONS

Manly et al., "A study of the chemistry of pyrophthalone and related compounds", J. Org. Chem., vol. 23 pp. 373-380 (Mar. 1958).*

Machine translation of JP 2004-142131.*

* cited by examiner

Fig. 1

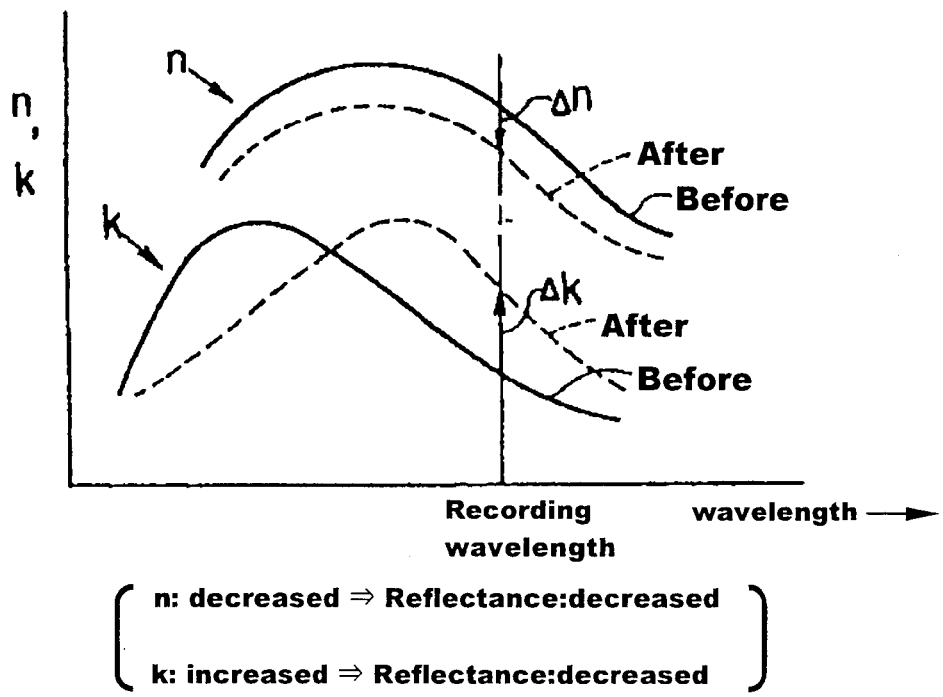

( n: decreased ⇒ Reflectance:decreased )
( k: increased ⇒ Reflectance:decreased )

Fig. 2

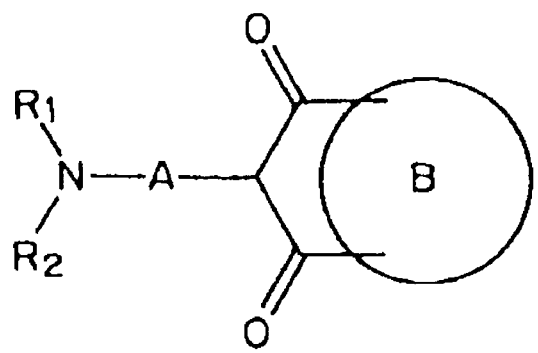

wherein "A" is a substituted or unsubstituted aryl group or a heterocyclic group; $R_1$ and $R_2$ are individually hydrogen atom, a substituted or unsubstituted alkyl group, a substituted or unsubstituted aralkyl group or a substituted or unsubstituted aryl group; "B" is a residue of aromatic ring.

Fig. 3

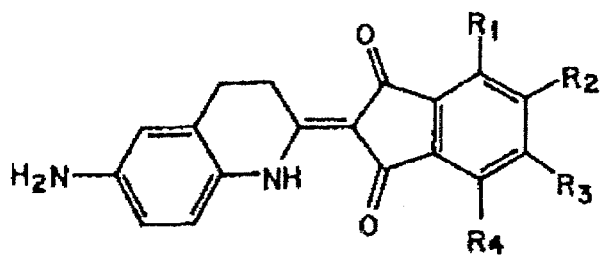

wherein $R_1$, $R_2$, $R_3$ and $R_4$ are individually hydrogen atom or a substituent group.

Fig. 4

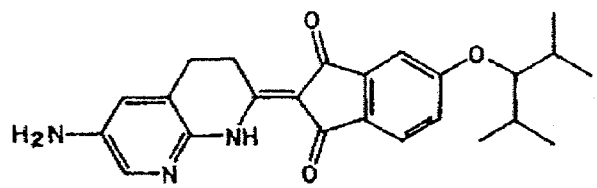

Fig. 5

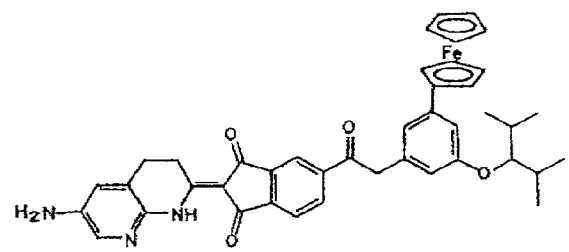

Fig. 6

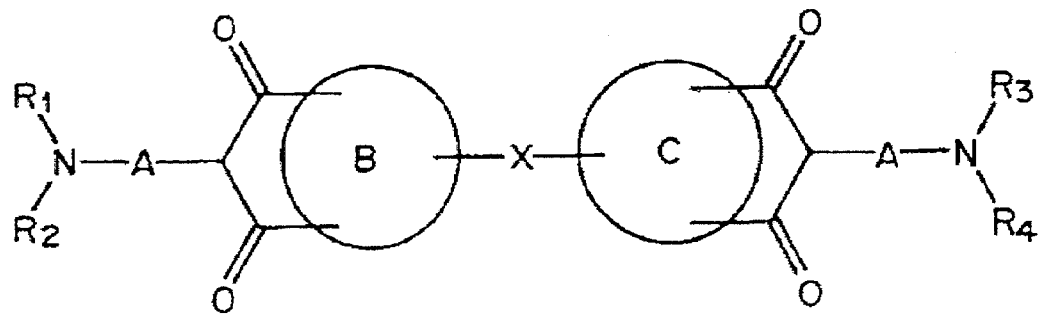

wherein "A" is a substituted or unsubstituted aryl group or a heterocyclic group; $R_1$, $R_2$, $R_3$ and $R_4$ are individually hydrogen atom, a substituted or unsubstituted alkyl group, a substituted or unsubstituted aralkyl group or a substituted or unsubstituted aryl group; "B" and "C" are individually a residue of aromatic ring; "X" is a substituted or unsubstituted linking group.

Fig. 7
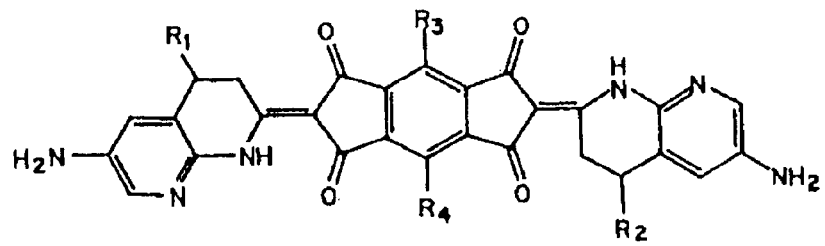
wherein $R_1$, $R_2$, $R_3$ and $R_4$ are individually hydrogen atom or a substituent group.
Fig. 8
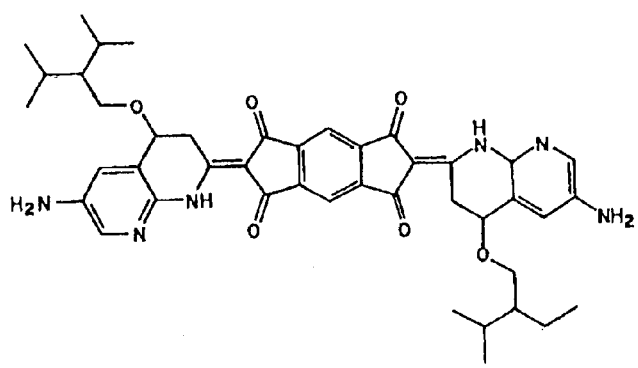
Fig. 9
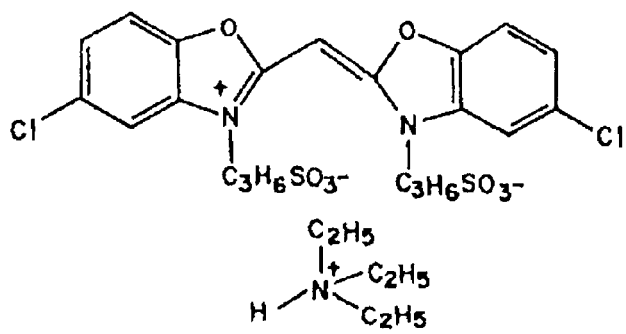
Fig. 10
Results Assessed of Recording Properties
| Items of assessment | Examples | Comp. Examples |
|---|---|---|
| Recording Power (mW) | 4.2 | 8.4 |
| Rtop (%) | 17.4 | 17.2 |
| I11/Itop | 0.4 | 0.5 |
| Asymmetry | 0.01 | 0.01 |
| SbER | 1.50E-05 | 6.50E-04 |
| PRSNR | 15.8 | 20.6 |

Fig. 11
|  | Optical Constant of Dyestuff | |
|---|---|---|
|  | n | k |
| Before recording | 1.847 | 0.170 |
| After recording | 1.792 | 0.220 |
| Magnitude of change | −0.055 | 0.050 |
Fig. 12
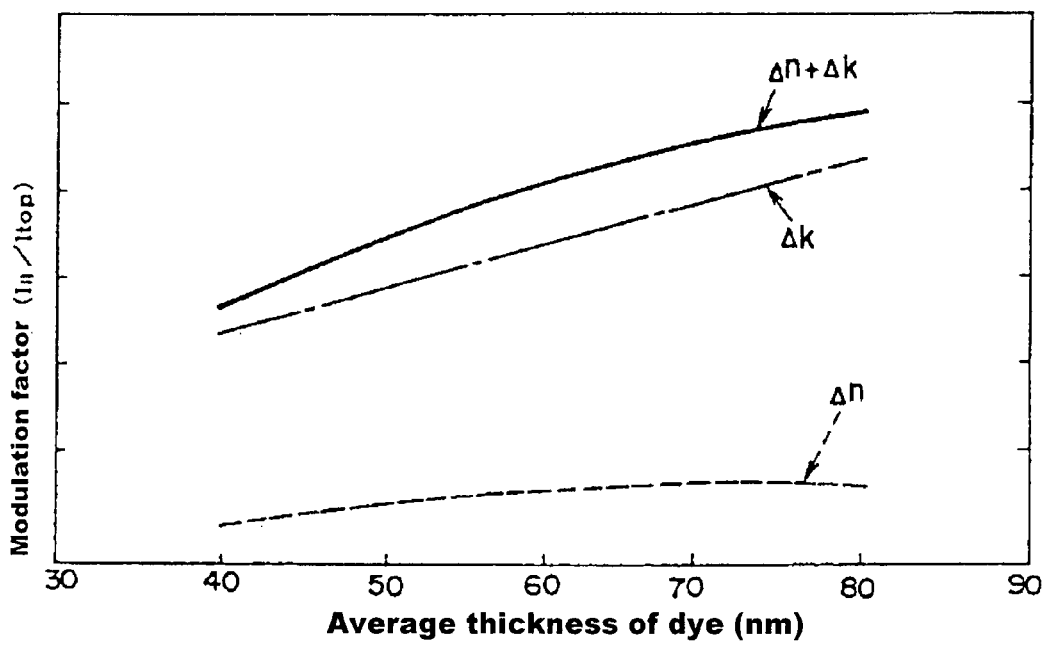
Fig. 13
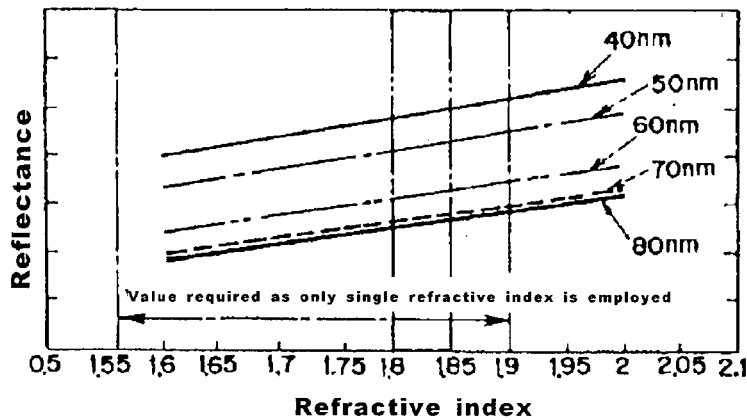

| Dyestuff | Structure | Reflectance n | | | Extinction Coeff.k | | | Modu.Factor |
|---|---|---|---|---|---|---|---|---|
| | Ferrocene | Ini. | Aft.Rec. | Δ | Ini. | Aft.Rec. | Δ | I11/I11h |
| HV-154 | Yes | 1.785 | 1.777 | -0.008 | 0.253 | 0.270 | 0.017 | 0.16 |
| HV-153 | Yes | 1.83 | 1.78 | -0.05 | 0.180 | 0.219 | 0.039 | 0.36 |
| HV-186 | Yes | 1.86 | 1.80 | -0.06 | 0.169 | 0.221 | 0.052 | 0.39 |
| HV-190 | Yes | 1.82 | 1.77 | -0.05 | 0.227 | 0.250 | 0.023 | 0.30 |
| HV-192 | Yes | 1.8 | 1.77 | -0.03 | 0.216 | 0.268 | 0.052 | 0.29 |
| HV-199 | No | 1.79 | 1.75 | -0.04 | 0.240 | 0.293 | 0.053 | 0.32 |
| HV-201 | No | 1.759 | 1.73 | -0.02 | 0.144 | 0.192 | 0.048 | 0.39 |

** OPTICAL INFORMATION RECORDING MEDIUM AND RECORDING METHOD THEREOF

TECHNICAL FIELD

This invention relates to a postscript (write once) type optical information recording medium and to the recording method thereof. In particular, this invention relates to an optical information recording medium which is capable of writing information by means of a semiconductor laser such as a laser beam having a wavelength of 350-500 nm (blue laser, a blue laser beam) and to the recording method thereof.

BACKGROUND ART

Nowadays, many efforts have been conducted trying to develop an optical information recording medium of postscript type which is designed to use a blue laser beam having a wavelength in the vicinity of 350-500 nm (for example, around 405 nm) which is shorter in wavelength than that conventionally employed. In this optical information recording medium, an organic dye compound is employed for creating an optical recording layer. As the organic dye compound absorbs laser beam, the organic dye compound is decomposed (e.g. thermal decomposition) or denatured, thereby bringing about a change in optical properties of the laser beam of recording or regenerating wavelength. This change is then picked up respectively as a modulation factor, thereby making it possible to perform the recording as well as the regeneration.

In conformity with recent trend to increase the density and the velocity of recording, a laser beam of shorter wavelength zone is now increasingly employed in the recording. As the laser beam to be employed is getting shorter in wavelength, the optical recording layer is required to be formed increasingly thinner. Therefore, the development of the optical information recording medium is now being advanced especially attaching importance to the selection of dyes having a higher refractive index.

Namely, it has been practiced to secure the modulation factor by taking advantage of the optical phase difference that can be generated due to a change in refractive index at the recording or regenerating wavelength.

A general structure of an optical information recording medium 1 which is capable of recording and regenerating information by means of a blue laser beam will be explained with reference to FIG. 15.

FIG. 15 illustrates an enlarged cross-sectional view of a main portion of a disc-like optical information recording medium 1. More specifically, FIG. 15 is a cross-sectional view of the optical information recording medium 1 as it is sectioned diametrally. Namely, FIG. 15 schematically shows a cross-section of the optical information recording medium 1 as it is sectioned perpendicular to the surface provided with a pre-groove 7 and also perpendicular to the direction of the pre-groove 7. This optical information recording medium 1 comprises a light-transmitting substrate 2, an optical recording layer 3 (light-absorptive layer) formed on the substrate 2, a light-reflecting layer 4 formed on the optical recording layer 3, and a protective layer 5 (adhesive layer) formed on the light-reflecting layer 4. By the way, under some circumstances, a dummy layer 6 having a predetermined thickness may be laminated on the top of the protective layer 5 so as to make the optical information recording medium 1 have a predetermined thickness which is required by the specification.

The substrate 2 is provided in advance with a pre-groove 7 which is formed spirally. On both sides of this pre-groove 7, there are located lands 8 constituting the regions other than the pre-groove 7.

As shown in FIG. 15, as a laser beam (recording beam) 9 is irradiated onto the optical information recording medium 1 from the light-transmitting substrate 2 (incident layer) side, the optical recording layer 3 is caused to generate heat (or absorb heat) as the energy of the laser beam 9 is absorbed by the optical recording layer 3, thereby forming a recording pit 10 through the thermal decomposition of the optical recording layer 3.

By the way, the substrate 2 is contacted, through a first boundary layer (or interface) 11, with the optical recording layer 3.

The optical recording layer 3 is contacted, through a second boundary layer 12, with the light-reflecting layer 4.

The light-reflecting layer 4 is contacted, through a third boundary layer 13, with the protective layer 5.

The protective layer 5 is contacted, through a fourth boundary layer 14, with the dummy substrate 6.

The light-transmitting substrate 2 can be generally formed using a resin having a high transparency exhibiting a refractive index ranging from about 1.5 to 1.7 to a laser beam and being excellent in impact resistance. For example, the light-transmitting substrate 2 can be formed using a polycarbonate plate, an acrylic plate, an epoxy resin plate, etc. It is also possible to use a glass plate as the light-transmitting substrate 2.

The optical recording layer 3 deposited on the substrate 2 is formed of a layer made of a light-absorptive substance (a light-absorbing substance) containing a dyestuff. This optical recording layer 3 is caused to generate heat as it is irradiated with a laser beam 9, thereby bring about the thermal decomposition, the heat generation, the absorption of heat, melting, sublimation, deformation or denaturing. This optical recording layer 3 can be formed, for example, by uniformly coating an azo-based dye, a cyanine dye, etc., which has been dissolved in a solvent, on the surface of substrate 2 by means of spin-coating method, etc.

With respect to the materials to be employed for forming the optical recording layer 3, although it is possible to employ any kind of optical recording materials, it is more preferable to employ a photoabsorptive organic dye.

The light-reflecting layer 4 is formed of a metal film which is high in heat conductivity and light reflectance, and can be created by the deposition of gold, silver, copper, aluminum, or an alloy comprising any of these metals by means of vapor deposition method, sputtering method, etc.

The protective layer 5 can be formed, as in the case of the substrate 2, by making use of a resin which is excellent in impact resistance and adhesion. For example, the protective layer 5 can be formed by coating an ultraviolet-curing resin on the light-reflecting layer 4 by means of spin-coating method followed by the curing of the coated layer through the irradiation of ultraviolet rays thereto.

The dummy layer 6 can be formed by making use of the same kinds of materials as those of the substrate 2, thereby securing a predetermined thickness (about 1.2 mm) of the optical information recording medium.

Further, FIG. 16 is an enlarged cross-sectional view illustrating, as in the case of FIG. 15, a main portion of a disc-like optical information recording medium 20 of another type using a blue laser beam. In this case, the optical information recording medium 20 comprises a light-transmitting substrate 2 having a thickness of 1.1 mm, a light-reflecting layer 4 formed on the substrate 2, an optical recording layer 3

(light-absorptive layer) formed on the light-reflecting layer 4, a protective layer 5 formed on the optical recording layer 3, an adhesive layer 21 formed on the protective layer 5, and a cover layer 22 having a thickness of 0.1 mm and formed on the adhesive layer 21.

The substrate 2 is provided in advance with a pre-groove 7 which is formed spirally. On both sides of this pre-groove 7, there are located lands 8 constituting the regions other than the pre-groove 7.

By the way, if a boundary layer between the substrate 2 and the optical recording layer 3 satisfies a low reflectance and, furthermore, if the light reflected from the optical recording layer 3 is sufficient enough, the provision of light-reflecting layer 4 may not be required.

As shown in FIG. 16, as a laser beam (recording beam) 9 is irradiated onto the optical information recording medium 20 from the light-transmitting incident layer (the cover layer 22) side, the optical recording layer 3 is caused to generate heat (or absorb heat) as the energy of the laser beam 9 is absorbed by the optical recording layer 3, thereby forming a recording pit 10 through the thermal decomposition of the optical recording layer 3.

By the way, the substrate 2 is contacted, through a first boundary layer 23, with the light-reflecting layer 4.

The light-reflecting layer 4 is contacted, through a second boundary layer 24, with the optical recording layer 3.

The optical recording layer 3 is contacted, through a third boundary layer 25, with the protective layer 5.

The protective layer 5 is contacted, through a fourth boundary layer 26, with the adhesive layer 21.

The adhesive layer 21 is contacted, through a fifth boundary layer 27, with the cover layer 22.

In the optical information recording medium 1 or the optical information recording medium 20, which are constructed as described above, the laser beam 9 is irradiated onto the recording film of the optical recording layer 3 through the transparent substrate 2 or through the cover layer 22, and the energy of this beam is converted into a thermal energy, thereby bring about the generation of heat causing thermal decomposition, i.e. heating, melting, sublimation, or decomposition, thus creating a recording pit 10. By making use of this recording pit 10, the contrast that can be created due to the reflectance of light at the recorded portion or unrecorded portion is read out as an electric signal (modulation factor).

As described above, in the optical information recording medium 1 or the optical information recording medium 20, the recording pit 10 is created mainly through the change in refractive index that can be caused due to the thermal decomposition of an organic dye compound as the laser beam 9 is irradiated onto the optical recording layer 3 formed of the organic color dye compound.

As a result, the optical constant and decomposition behavior of the organic color dye compound to be employed in the optical recording layer 3 are now important factors in order to create excellent recording pit.

Therefore, the organic color dye compound to be employed in the optical recording layer 3 is now required to be selected from those which are excellent in optical properties and in decomposition behavior to blue laser wavelength. Namely, with the view of securing excellent recording/regenerating properties even in the blue laser wavelength zone, there has been tried to enhance the reflectance of the optical recording layer 3 when it is not yet recorded and to cause a large change in refractive index as the organic dye compound is thermally decomposed by the irradiation of laser beam (thereby making it possible to secure a large modulation factor).

The change of refractive index "n" and of the extinction coefficient "k" of the organic dye compound employed as the optical recording layer 3 due to the absorption of laser beam 9 by the organic dye compound will be explained in reference to FIG. 17.

FIG. 17 is a graph showing the relationship between the wavelength of the laser beam 9 and the refractive index "n" and the relationship between the wavelength of the laser beam 9 and the extinction coefficient "k". As the organic dye compound employed is thermally decomposed, the molecular bond is destroyed, resulting in the decrease of refractive index "n" after recording and hence resulting in the decrease of reflectance "R". Therefore, there has been conventionally tried to increase the magnitude of change "Δn" in refractive index "n" to thereby secure a sufficient magnitude of the change "ΔR" in reflectance, thus securing a modulation factor between the recording pit 10 and other portions of the optical recording layer 3 and making it possible to perform regenerable recording.

Further, the graph describing the extinction coefficient "k" is substantially the same as the graph describing the absorbency to the laser beam 9 of the dye, so that it is generally practiced to make the wavelength on the long wavelength side of this absorption peak (recording wavelength) the same as the wavelength of recording beam (laser beam 9). Namely, since the graph of refractive index "n" indicates the absorption peak on the long wavelength side of the graph of the extinction coefficient "k", it is possible to secure a large magnitude of change "Δn" in refractive index "n" at this recording wavelength.

On the other hand, it is well known that, as in the case of the refractive index "n", the extinction coefficient "k" is caused to decrease after recording at the same recording wavelength due to the destruction of molecular bond of the organic dye compound as a result of thermal decomposition of the organic dye compound. As the extinction coefficient "k" is decreased, the reflectance "R" is caused to increase. Namely, the change "Δk" of the extinction coefficient "k" acts to decrease the magnitude of change "ΔR" in the reflectance "R" due to the change "Δn" in refractive index "n". Namely, the absolute value of "ΔR" can be derived as a magnitude corresponding to (Δn−Δk). Therefore, according to the prior art, the interest of development of optical information recording medium is focused to find a way to increase the "Δn" as much as possible in order to secure a desired level of modulation factor and to select a dye exhibiting as small magnitude of "Δk" as possible.

Actually however, no one has succeeded as yet to obtain a suitable dye which is useful as a coloring material of the optical recording layer 3 with respect to the laser beam 9 having a recording wavelength within the range of 350-500 nm (for example, around 405 nm).

As described above, the coloring material is required to exhibit a suitable extinction coefficient "k" (absorption coefficient) and a large refractive index "n" so as to secure a sufficient contrast before and after the recording. Therefore, the coloring material has been selected such that the recording/regenerating wavelength can be located at the skirts of the long wavelength side of absorption peak of absorption spectrum of dye, thus designing the optical recording layer 3 so as to secure a large magnitude of change "Δn" in refractive index "n".

Further, as for the properties demanded of the organic compound, the behavior of decomposition thereof is required to be suitably selected in addition to the aforementioned optical properties to the blue laser beam wavelength. However, the materials having an optical property indicating a refractive index "n" which is comparable to that of the conventional CD-R or DVD-R in this short wavelength zone is extremely limited in kinds. Namely, in order to bring the absorption band of an organic compound close to the wavelength of blue laser beam, the molecular skeleton of the organic compound is required to be minimized or the conjugated system of the organic compound is required to be shortened. However, when the structure of the organic compound is adjusted in this manner, it will invite the decrease of the extinction coefficient "k" or the decrease of the refractive index "n".

As for the method of overcoming these problems, there have been recently reported possibilities of improving the optical properties of organic compound through the utilization of interaction between molecules such as association instead of utilizing the optical properties of the simple substance of dye molecule. However, no one has succeeded as yet to realize satisfactory recording properties by making use of such a method.

Meanwhile, if a high-speed recording is to be performed by making use of the optical information recording medium 1 or the optical information recording medium 20, it is required to perform a predetermined recording in a shorter period of time than that required in the conventional speed of recording or low speed recording. Therefore, the recording power is required to be increased, thus increasing a quantity of heat or a quantity of heat per unit time at the optical recording layer 3 on the occasion of the recording. As a result, the problem of thermal strain tends to become more prominent, thus giving rise to the generation of non-uniformity of recording pits 10. Further, since there is a limit in increasing the output power of semiconductor laser for emitting the laser beam 9, it is now demanded to develop a dyestuff having such a high sensitivity that can be coped with a high-speed recording.

As described above, since an organic dye compound is employed in the optical recording layer 3 in the cases of the optical information recording mediums 1 and 20, the development of optical information recording medium is mainly directed to a dyestuff which is capable of exhibiting high refractive index to the laser beam 9 of short wavelength side.

Namely, as long as the conventional postscript type optical information recording medium using an organic dye compound is concerned, only the organic compounds which are capable of exhibiting a large refractive index and a relatively small extinction coefficient (0.05-0.07) to a recording/regenerating wavelength are enabled to be employed in viewpoints of securing modulation factor and reflectance.

Since there are known at present a large number of organic dye compounds having an absorption band which is close to the blue laser wavelength, the extinction coefficient "k" thereof can be controlled. However, since these organic dye compounds fail to have a large refractive index "n", the dye compound layer is required to have a certain degree of film thickness in order to obtain modulation factor securing a sufficient optical phase difference of the recording portion (recording pit 10).

However, since the organic compound is incapable of exhibiting a large absorption power to the recording beam, it is impossible to make thinner the film thickness of the organic compound film. Therefore, it is required to employ a substrate 2 having a deep trench (since the film of organic compound is formed by means of spin-coating, the increase of film thickness of the organic compound film is achieved by depositing the organic compound in a deep trench). In this case however, it is very difficult to fabricate a substrate 2 having a deep trench, giving rise to the deterioration in quality of the optical information recording medium.

Additionally, since the recording medium where blue laser beam is employed is demanded to execute a high-density recording, the physical track pitch is required to be formed narrow. As a result, when a laser beam of high output such as blue laser beam is employed, the heat generated on the occasion of the decomposition of dye compound is liable to be accumulated, thus enabling the heat generated on the occasion of the decomposition of dye compound to easily transmit to the neighboring tracks and hence raising the problem that the properties of the recording medium will be deteriorated.

As described above, the recording medium using a blue laser wavelength zone where the refractive index of dyestuff (organic dye compound) cannot be easily enhanced is accompanied with the problem that it is difficult to enable the recording medium to exhibit excellent recording properties in the conventional recording to be effected through the phase change of the change of refractive index "n".

Patent document 1: JP-A 2003-223740 (KOKAI)
Patent document 2: JP-A 2003-331465 (KOKAI)
Patent document 3: JP-A 2004-142131 (KOKAI)
Patent document 4: JP-A 2004-216714 (KOKAI)

DISCLOSURE OF INVENTION

Problems to be Solved by the Invention

The present invention has been accomplished in view of the aforementioned problems and hence, an object of the present invention is to provide an optical information recording medium comprising a dyestuff, which is suited for optical recording of high density and high speed by means of a novel recording system using a recording wavelength of 350-400 nm, in particular, around 400 nm (for example, 405 nm), the recording system being different from the conventional recording system. Another object of the present invention is to provide a recording method of such an optical information recording medium.

Further, further objects of the present invention are to provide an optical information recording medium which is capable of performing the recording by making use of a blue laser beam without necessitating to increase the film thickness of dyestuff of the optical recording layer and to provide a recording method thereof.

Further, further objects of the present invention are to provide an optical information recording medium which is capable of performing the recording with low power and suppressing the thermal influence that may be caused due to the recording onto the optical recording layer and to provide a recording method thereof.

Further, further objects of the present invention are to provide an optical information recording medium which is capable of performing the recording with a wavelength located on the long wavelength side of the absorption peak and which capable of expecting the synergistic effects to secure the reflectance and modulation factor that can be derived from the synergistic effects to be obtained from the change of extinction coefficient "k" or from the change of refractive index "n" and of extinction coefficient "k". A further object of the present invention is to provide a recording method of such an optical information recording medium.

Means for Solving the Problems

Namely, according to the present invention, it has been taken notice of performing the recording based mainly on an optical phase difference to be brought about by the change "Δk" of the extinction coefficient "k" of dyestuff and not based on an optical phase difference to be brought about by the change "Δn" in refractive index "n" of dyestuff as conventionally conducted. Thus, the present invention is based on the finding of possibility of obtaining a dyestuff which is useful in carrying out the aforementioned recording, wherein the recording is performed mainly based on the change "Δk" of the extinction coefficient "k" of dyestuff.

Namely, it is designed to form a recording pit on the unrecorded optical recording layer formed of an organic dye compound by making use of the color change of the organic dye composition of optical recording layer as a result of recording.

More specifically, there is employed a dyestuff whose main absorption band (absorption peak) before recording is located on the short wavelength side relative to the recording/regenerating wavelength and which can be colored or discolored (absorption) at the recording/regenerating wavelength zone after the irradiation of laser beam. More preferably, there is employed a dyestuff whose color can be thickened as it is irradiated with laser beam as compared with the color thereof before the irradiation of the laser beam.

FIG. 1 is a graph showing a recording system of the present invention and illustrating a relationship between the wavelength of the laser beam 9 and the refractive index "n" and the relationship between the wavelength of the laser beam 9 and the extinction coefficient "k", wherein a dyestuff useful in the present invention is employed. As seen from this graph, while the refractive index "n" was caused to decrease, the extinction coefficient "k" was caused to increase as a result of recording at the recording wavelength. According to this novel recording system, it has been taken notice of the facts that the magnitude of decrease "Δn" of refractive index "n" becomes smaller and the magnitude of change (increment) "Δk" of the extinction coefficient "k" becomes larger. At the same time, it has been found possible to obtain such a dyestuff which is useful in this recording system. It has been also found possible to suppress to a possible extent the influence of the generation of heat that has been a problem involved in the conventional recording system where a change of refractive index due to thermal decomposition are utilized.

As a result of extensive studies made by the present inventors, it has been succeeded to find out an optical recording layer exhibiting excellent recording/regenerating properties that can be manifested through the coloring (increase in concentration) or discoloration of the optical recording layer while enabling to retain mainly the composition of an organic dye compound and by making use of recording/regenerating beam of high output and of short wavelength such as blue laser beam. This indicates that it is possible to secure a sufficient optical phase difference through a quantity of change "Δk" of the extinction coefficient "k" of dyestuff that can be brought about by the recording and also possible to minimize the influence of heat generation through the suppression, as much as possible, of the change "Δn" in refractive index that may be caused to occur due to the thermal decomposition of the organic dye compound.

Namely, it is now possible to decrease the reflectance "R" by increasing the extinction coefficient "k", thus making it possible to derive a sufficient degree of change "ΔR" in reflectance which is required for securing the modulation factor. Moreover, due to the decrease of refractive index "n", the reflectance "R" can be also decreased, thus making it possible to further increase the change "ΔR" in combination with the change "Δk" of the extinction coefficient "k". Namely, it is now possible to obtain the absolute value of "ΔR" as a quantity corresponding to a value of (Δk+Δn).

Therefore, it is now possible to perform the recording through the change of the extinction coefficient "k" and not through the employment of a dyestuff exhibiting a high refractive index as conventionally conducted. Moreover, if the decrease of the change "Δn" is confined to a predetermined level which is smaller than the conventional level, the generation of heat due to the thermal decomposition of the organic dye composition can be suppressed correspondingly. Therefore, it is now possible to secure the change "ΔR" of reflectance "R" to be caused by the change "Δn" in addition to the change "Δk", thus making it possible to realize efficient recording through synergistic effects to be derived from the refractive index "n" and the extinction coefficient "k". Namely, the recording power may be of a lower level as compared with the conventional level and the recording with lower power is effective in enhancing the reliability of the recording of high density and high speed especially.

Thus, according to a first aspect of the present invention, there is provided an optical information recording medium comprising a light-transmitting substrate, and an optical recording layer containing a light-absorbing substance constituted by a dyestuff which is capable of absorbing laser beam, wherein an optically readable information is recorded through an irradiation of the laser-beam onto the optical recording layer. In this optical information recording medium, a wavelength on the long wavelength side of the absorption peak of the absorption spectrum of the dyestuff to the laser beam is preferably employed as a recording wavelength. However, this invention is not limited to such a kind of optical information recording medium but may be an optical information recording medium which is characterized in that the aforementioned recording can be performed through the change of extinction coefficient of the dyestuff relative to the recording wavelength.

According to a second aspect of the present invention, there is provided an optical information recording medium comprising a light-transmitting substrate, and an optical recording layer containing a light-absorbing substance constituted by a dyestuff which is capable of absorbing laser beam, wherein an optically readable information is recorded in the optical recording layer through an irradiation of the laser beam onto the optical recording layer, this optical information recording medium being featured in that the dyestuff is enabled to not so greatly change in refractive index but enabled to greatly change in extinction coefficient as a result of the recording, thereby making it possible to record the information through the change of extinction coefficient.

The extinction coefficient of the dyestuff may be 0.25 or less before the recording.

The extinction coefficient of the dyestuff may be such that it is enabled to change at a ratio of not less than 30% as a result of the recording as compared with that before the recording.

The refractive index of the dyestuff may be confined to the range of 1.5 to 2.0 before the recording.

The refractive index of the dyestuff may be such that it is enabled to change at a ratio of not more than 10% as a result of the recording as compared with that before the recording.

According to a third aspect of the present invention, there is provided an optical information recording medium comprising a light-transmitting substrate, and an optical recording layer containing a light-absorbing substance constituted by a dyestuff which is capable of absorbing laser beam (especially, an organic dyestuff) wherein an optically readable information is recorded through an irradiation of the laser beam onto the optical recording layer, wherein the optical recording layer is enabled to form an isomer due to the light created by an irradiation of the laser beam thereto and due to the heat generated by the absorption of the laser beam. Preferably, this optical information recording medium is characterized in that the isomer is enabled to form a polarized structure which is unbalanced in electric charge as it is irradiated with the laser beam, this polarized structure being designed to be orientated by an electrostatic interaction, thereby making it possible to record the information.

The organic dyestuff may comprise a compound whose absorption peak is enabled to shift to the long wavelength side as a result of the recording.

The organic dyestuff may be enabled to change in extinction coefficient as the aforementioned polarized structure is orientated.

According to a fourth aspect of the present invention, there is provided an optical information recording medium comprising a light-transmitting substrate, and an optical recording layer containing a light-absorbing substance constituted by a dyestuff which is capable of absorbing laser beam, wherein an optically readable information is recorded through an irradiation of the laser beam onto the optical recording layer, this optical information recording medium being featured in that a wavelength on the long wavelength side of the absorption peak of the absorption spectrum of the dyestuff to the laser beam is employed as a recording wavelength and that the recording is performed through the change of extinction coefficient of the dyestuff relative to the recording wavelength.

According to a fifth aspect of the present invention, there is provided an optical information recording medium comprising a light-transmitting substrate, and an optical recording layer containing an organic dyestuff which is capable of absorbing laser beam, wherein an optically readable information is recorded through an irradiation of the laser beam onto the optical recording layer, this optical information recording medium being featured in that the optical recording layer is enabled to record the information at a wavelength ranging from 350 to 500 nm and contains an organic dye compound having reversible optical properties.

An oxidation preventive layer may be disposed on one side of and close to the optical recording layer, the oxidation preventive layer containing at least one kind of compound selected from the group consisting of hindered amine (HALS)-based compound, a phenolic compound, an amine-based compound, a phosphate-based compound and an organosulfur-based compound.

Further, the optical recording layer may contain an oxidation preventing agent comprising at least one kind of compound selected from the group consisting of hindered amine (HALS)-based compound, a phenolic compound, an amine-based compound, a phosphate-based compound and an organosulfur-based compound.

The optical recording layer may further contain a rust preventive formed of a benzotriazole-based compound or a benzothiazole-based compound.

The aforementioned substrate may be provided with trenches about 400 nm in track pitch, each trench having a width of about 220-270 nm and a depth of about 55-80 nm.

According to a sixth aspect of the present invention, there is provided an optical information recording medium comprising a light-transmitting substrate, and an optical recording layer containing a light-absorbing substance constituted by a dyestuff which is capable of absorbing laser beam, wherein an optically readable information is recorded through an irradiation of the laser beam onto the optical recording layer, this optical information recording medium being featured in that the dyestuff is constituted by a dye compound represented by a chemical structure shown in FIG. 2.

The dyestuff may be constituted by a dye compound represented by a chemical structure shown in FIG. 3.

The dyestuff may be constituted by a dye compound represented by a chemical structure shown in FIG. 4.

The dyestuff may be constituted by a dye compound represented by a chemical structure shown in FIG. 5.

By the way, the expression of "aryl group or heterocyclic structure" in FIGS. 2 and 6 is intended to include, in its concept, "aryl group or heterocyclic structure" and hence may be expressed as "aryl group or heterocyclic structure". Likewise, the expression of "having hydrogen atom or a substituent group" in FIG. 3 is intended to include, in its concept, "having hydrogen atom and a substituent group" and hence may be expressed as "having hydrogen atom and a substituent group".

According to a seventh aspect of the present invention, there is provided an optical information recording medium comprising a light-transmitting substrate, and an optical recording layer containing a light-absorbing substance constituted by a dyestuff which is capable of absorbing laser beam, wherein an optically readable information is recorded through an irradiation of the laser beam onto the optical recording layer, this optical information recording medium being featured in that the dyestuff is constituted by a dye compound represented by a chemical structure shown in FIG. 6.

The dyestuff may be constituted by a dye compound represented by a chemical structure shown in FIG. 7.

The dyestuff may be constituted by a dye compound represented by a chemical structure shown in FIG. 8.

The wavelength located on the long wavelength side of the absorption peak of the absorption spectrum of the dyestuff to the laser beam may be employed as a recording wavelength.

According to a eighth aspect of the present invention, there is provided a recording method of an optical information recording medium comprising a light-transmitting substrate, and an optical recording layer containing a light-absorbing substance constituted by a dyestuff which is capable of absorbing laser beam, wherein an optically readable information is recorded through an irradiation of the laser beam onto the optical recording layer, this recording method of the optical information recording medium being featured in that a wavelength on the long wavelength side of the absorption peak of the absorption spectrum of the dyestuff to the laser beam is employed as a recording wavelength and that the recording is performed through the change of extinction coefficient of the dyestuff relative to the recording wavelength.

The optical information recording medium may include a light-reflecting layer which is capable of reflecting the laser beam.

The change of refractive index of the dyestuff relative to the aforementioned recording wavelength may be combined with the change of the extinction coefficient, thereby making it possible to perform the aforementioned recording by making use of these changes.

The dyestuff may be selected from those whose extinction coefficient is enabled to greatly change at the aforementioned recording wavelength.

The dyestuff may be selected from those whose extinction coefficient is enabled to greatly increase at the aforementioned recording wavelength.

The dyestuff may be selected from those which can be isomerized as it is irradiated with the laser beam.

The aforementioned recording wavelength may be confined to the range of 350 nm to 500 nm.

The aforementioned recording wavelength may be confined to 405 nm.

By the way, each of the aforementioned limiting constituent features described subsequent to each of main inventions may be adopted as limiting constituent features in any of other main inventions described above. For example, the light-reflecting layer may be included in any of the main inventions described above.

Effects of the Invention

According to the optical information recording medium and the recording method thereof, it is possible to perform optical recording not through a large magnitude of change of dyestuff as conventionally conducted but through the change of extinction coefficient "k" of the dyestuff as represented by the dye compounds having chemical structures as shown in FIGS. 2 and 6 or as shown in FIGS. 3-5 and FIGS. 7 and 8 for instance. Further, for this reason, it is now possible to perform excellent optical recording by making use of blue laser and to perform the optical recording with low power since the dyestuff is not required to be heated to the decomposition temperature of the dyestuff. As a result, it is now possible to perform the optical recording at high sensitivity and high density, while securing the reliability and stability of the recording. In the conventional recording system where a thermal decomposition reaction of dyestuff is utilized, a large quantity of heat is generated at the time of the decomposition. Whereas in the case of the recording system as proposed by the present invention, wherein the structural change of dyestuff such as the tautomerization of dyestuff is utilized or the orientation of a polarized structure unbalanced in electric charge that can be effected through an electrostatic interaction is utilized, the generation of heat is suppressed, thus making it possible to minimize the transmission of heat to neighboring tracks (the problem that has been raised on the occasion of forming a recording pit) and to obtain an optical information recording medium having excellent recording properties.

Namely, in the case of the present invention, as the light and heat are applied to the optical recording layer on the occasion of recording through the irradiation of laser beam, the orientation of the dyestuff (organic dye compound) is caused to change in the optical recording layer, thereby increasing the absorption of laser beam by the dyestuff (due to the increase of the extinction coefficient "k") in the recording region at the recording/regenerating wavelength. As a result, the reflectance "R" is caused to decrease, thus securing the modulation.

Furthermore, since the recording is performed through the change of absorption to be caused by the orientation of dyestuff without generating the decomposition such as the thermal decomposition of the dyestuff, the generation of heat on the occasion of recording can be minimized. Namely, in the case of the prior art, the magnitude of change of the refractive index "n" through the decomposition of dyestuff has been a key. Whereas, in the case of the present invention, a key is not how to thermally decompose the dyestuff but how to change the absorbance of the dyestuff through the decomposition thereof or how to enlarge the change of reflectance "R" of dyestuff. Therefore the dyestuff, according to the present invention, is not necessarily required to be decomposed and the recording of information can be performed with low power.

Specifically, the dyestuff is irradiated with laser beam to isomerize the dyestuff or to generate an electrostatic interaction or the association among the dye molecules, thereby lowering the refractive index "n" and increasing the extinction coefficient "k". Preferably, an organic dye material exhibiting associating properties is employed in order to obtain excellent recording properties. By the way, when an organic dye material having a plurality of associating structures in the molecule thereof is employed, it is possible to expect further improved properties therefrom. Especially, since it is possible to sufficiently secure the dyestuff that has been isomerized, it is possible to obtain a dyestuff which is improved in desirable recording properties. Especially, a material having a plurality of isomerized structures in the molecule thereof (for example, materials shown in FIGS. 6 and 8) is expected to exhibit greatly improved properties.

Further, according to the present invention, since the organic compound layer (optical recording layer) is not restricted with regard to the refractive index "n" thereof, the organic compound layer is no longer required to have the light absorbing properties at all, so that it is no longer required such a severe restriction as conventionally required with regard to the optical constant.

Especially, according to the first, the second, the fourth and the fifth aspects of the invention, not only the decrease of the reflectance "R" due to the increase of the extinction coefficient "k" but also the decrease of the reflectance "R" due to the decrease of the refractive index "n" can be synergistically secured as a modulation factor, thereby making it possible to realize a more efficient recording as compared with the conventional recording.

Especially, according to the third aspect of the invention, since the organic dyestuff is enabled to form a polarized structure which is unbalanced in electric charge as it is irradiated with the laser beam, and this polarized structure is designed to be orientated by an electrostatic interaction to thereby make it possible to perform the recording, it is now possible to minimize, without generating a large magnitude of heat due to the recording that has been experienced in the conventional recording system, the transmission of heat to the neighboring track which has been a problem to be solved on the occasion of forming a recording pit, thereby making it possible to realize an efficient recording.

Especially, according to the sixth aspect of the invention, it is now possible to form an optical recording layer by making use of a dye compound having a relatively simple structure, enabling to perform more efficient recording as compared with the conventional recording.

Especially, according to the seventh aspect of the invention, since a dye compound having a plurality of tautomeric structures in the molecule thereof, it is now possible to further improve the optical properties and to perform stable recording.

Especially, according to the fourth and the eighth aspects of the invention, not only the decrease of the reflectance "R" due to the increase of the extinction coefficient "k" but also the decrease of the reflectance "R" due to the decrease of the refractive index "n" can be secured as a modulation factor, it is now possible to perform the recording with a lower power as compared with that employed in the conventional recording.

BRIEF DESCRIPTION OF DRAWINGS

FIG. 1 shows a graph showing the relationship between the wavelength of the laser beam 9 and the refractive index "n" and the relationship between the wavelength of the laser beam 9 and the extinction coefficient "k" in the optical recording layer 3 to be employed in the present invention;

FIG. 2 shows a general formula of a tautomeric organic dye compound or an organic dye compound (especially, an amine compound) having associating properties to be employed in the present invention;

FIG. 3 shows a general formula of one example of a heterocyclic compound (one of tautomeric structures or one of structures having associating properties) to be utilized in the present invention;

FIG. 4 shows a chemical structure of a preferable compound which is useful as an organic dye material to be employed in the optical recording layer 3 of the present invention or as a dyestuff to be employed in the following examples;

FIG. 5 shows a chemical structure of another preferable compound which is useful as an organic dye material to be employed in the optical recording layer 3 of the present invention;

FIG. 6 shows a general formula of a dyestuff having a plurality of tautomeric structures or a plurality of associating structures in its molecule, which is designed to be employed as an organic dyestuff of the present invention;

FIG. 7 shows a general formula of one example of the compound having a plurality of tautomeric structures or a plurality of associating structures in its molecule;

FIG. 8 shows a general formula of another example of the compound having a plurality of tautomeric structures or a plurality of associating structures in its molecule;

FIG. 9 shows a chemical formula of an oxacyanine dye employed in a comparative example;

FIG. 10 shows a table illustrating the results assessed of the recording properties of one example and one comparative example;

FIG. 11 shows a table illustrating the optical constants before and after the recording of a recording pit 10 in one example, i.e. a magnitude of the change "Δ" in refractive index "n" as well as in extinction coefficient "k" in the optical recording layer 3 of the disc employed in the example;

FIG. 12 is a graph illustrating the influence of the "Δn" and the "Δk" on the modulation factor (reflectance) in each of the discs which were fabricated in the same manner as one example, wherein the film thickness of the optical information recording medium 1 created by making use of the dyestuff shown in FIG. 4 was variously changed;

FIG. 13 is a graph illustrating the change of reflectance relative to the refractive index "n";

BEST MODE FOR CARRYING OUT THE INVENTION

According to the present invention, since not only the decrease of the reflectance "R" due to the increase of the extinction coefficient "k" but also the decrease of the reflectance "R" due to the decrease of the refractive index "n" can be secured as a modulation factor, it is now possible to perform the recording with a laser beam having a wavelength ranging from 350 nm to 500 nm. Further, since the recording layer contains an organic dye compound having a reversible optical property, i.e. since a dye compound having a structure represented by that shown in FIG. 2 or FIG. 6, it is now possible to obtain an optical information recording medium which is capable of performing more efficient recording as compared with the conventional optical information recording medium and to realize the recording method thereof in the recording especially by making use of blue laser beam.

Figure 15:
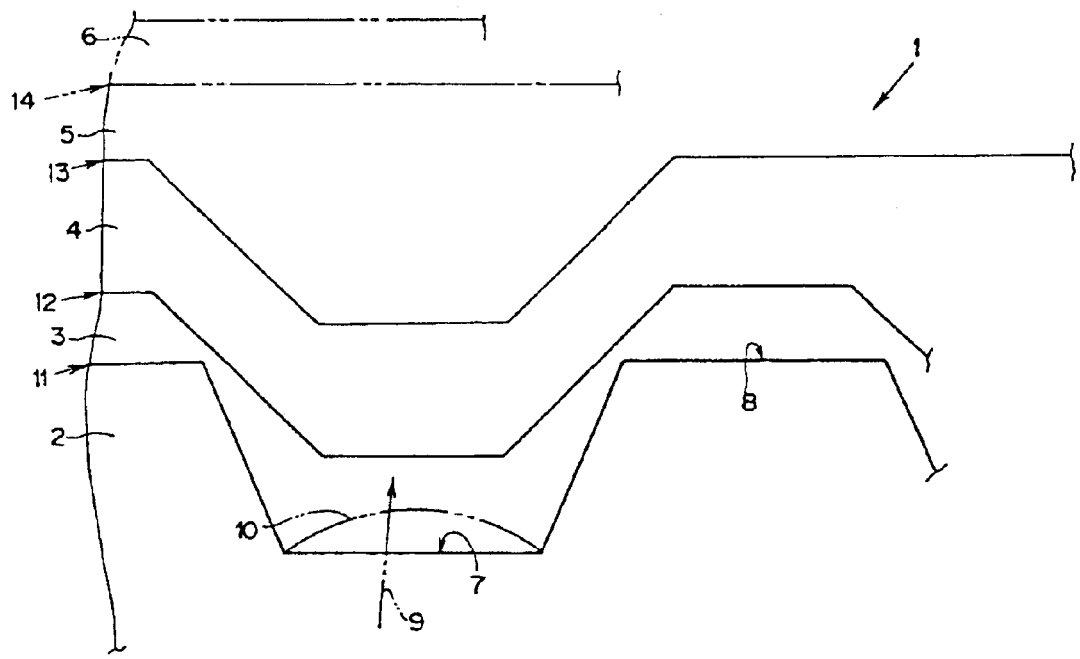
FIG. 15 is an enlarged cross-sectional view illustrating a main portion of a disc-like optical information recording medium 1 wherein a blue laser beam is to be employed.
Figure 16:
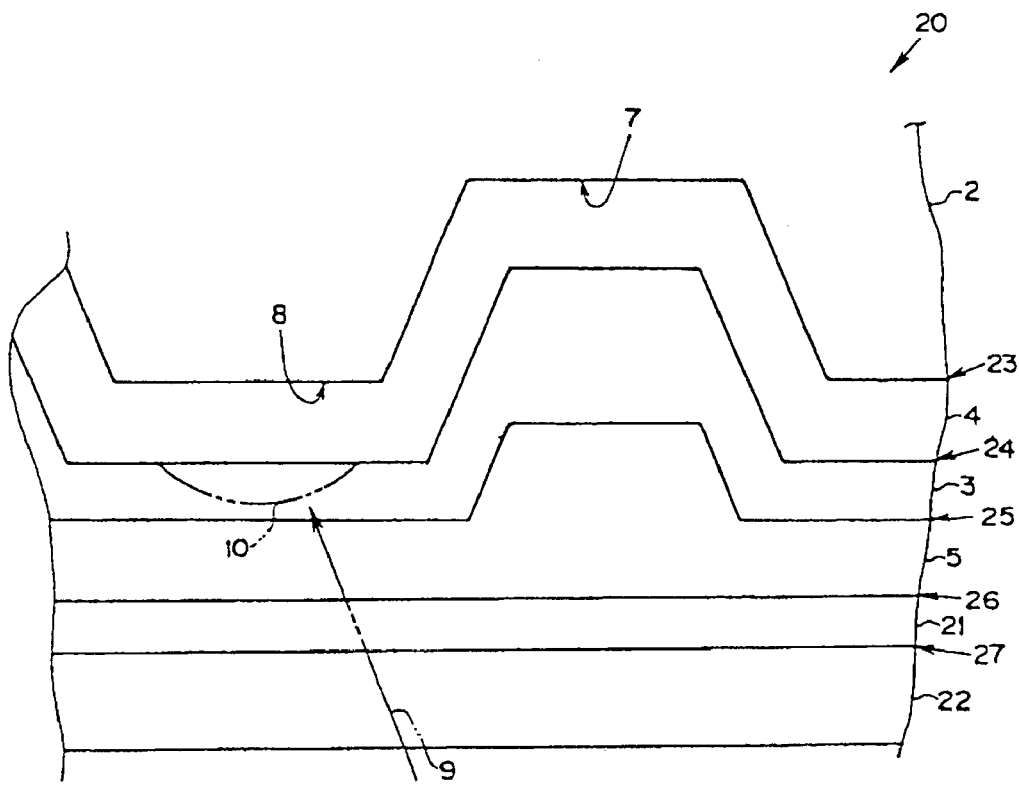
FIG. 16 is an enlarged cross-sectional view illustrating a main portion of a disc-like optical information recording medium 20 of another type wherein a blue laser beam is to be employed.
Figure 17:
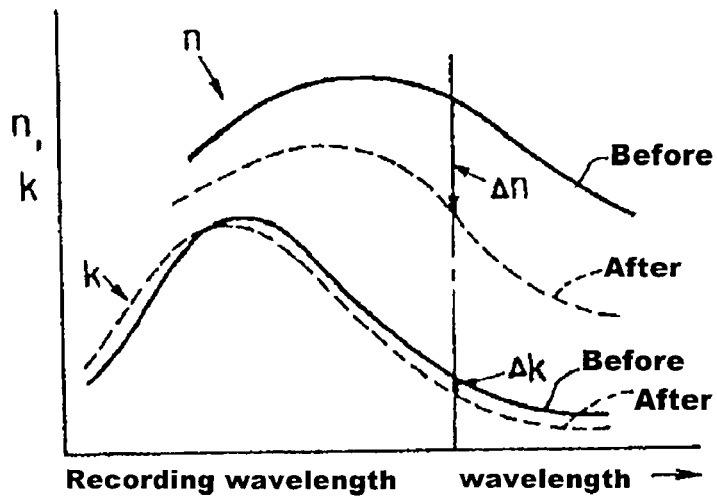
FIG. 17 is a graph showing the relationship between the wavelength of the laser beam 9 and the refractive index "n" and the relationship between the wavelength of the laser beam 9 and the extinction coefficient "k".

Next, the optical information recording medium and the recording method thereof according to various embodiments of the present invention will be explained with reference to FIGS. 2 to 20. In FIGS. 15 to 17, the same portions are identified by the same reference symbols, thereby omitting the detailed explanation thereof.

FIG. 2 shows a general formula of an isomerizable organic dye compound or an organic dye compound (especially, an amine compound) having associating properties to be employed in the present invention.

By the way, as for the ring constituting the residual group of the aromatic ring of the ring "B" in the general formula, it may preferably be constituted by a substituted or unsubstituted carbocyclic aromatic ring or a substituted or unsubstituted heterocyclic aromatic ring.

As for a preferable form of the heterocyclic compound according to the present invention, it is possible to employ a compound represented by the general formula shown in FIG. 3, which represents one of the isomerizable structure or one of the structures having associating properties.

Namely, FIG. 3 shows one example of the heterocyclic compound (one of the isomerizable structure or one of the structures having associating properties) to be utilized in the present invention. This compound has an isomerizable structure or may constitute a tautomeric body or may be a structure having associating properties or orientating properties to be caused by an electrostatic interaction.

By the way, as for the preferable examples of the substituent groups to be provided by $R_1$, $R_2$, $R_3$ and $R_4$ in the formula, they include halogen atom, nitro group, cyano group, hydroxyl group, mercapto group, carboxylic group, substituted or unsubstituted alkyl group, substituted or unsubstituted amide group, substituted or unsubstituted aralkyl group, substituted or unsubstituted aromatic ring group, substituted or unsubstituted alkoxy group, substituted or unsubstituted aralkyloxy group, substituted or unsubstituted aryloxy group, substituted or unsubstituted alkylthio group, substituted or unsubstituted aralkylthio group, substituted or unsubstituted arylthio group, substituted or unsubstituted amino group, substituted or unsubstituted acyl group, substituted or unsubstituted acyloxy group, substituted or unsubstituted alkoxycarbonyl group, substituted or unsubstituted aralkyloxycarbonyl group, substituted or unsubstituted aryloxycarbonyl group, substituted or unsubstituted alkenyloxycarbonyl group, substituted or unsubstituted aminocarbonyl group, substituted or unsubstituted alkenyl group, substituted or unsubstituted alkenyloxy group, substituted or unsubstituted alkenylthio group, substituted or unsubstituted heteroaryl group, substituted or unsubstituted heteroaryloxy group, substituted or unsubstituted heteroaryloxycarbonyl group, substituted or unsubstituted heteroarylthio group and substituted or unsubstituted metallocenyl group.

Among them, if the organic dyestuff has a substituent group consisting of amide group, preferably alkylamide, it may become more reactable by the light and heat to be provided by the laser beam, so that an isomer is more liable to be formed and that the organic dyestuff can be more easily orientated by the change in association thereof through an electrostatic action.

FIG. 4 shows a chemical structure of a preferable compound which is useful as a dye (organic dyestuff) to be employed in the optical recording layer of the present invention. This dyestuff is employed in the examples as explained below.

FIG. 5 shows a chemical structure of another preferable compound which is useful as an organic dyestuff to be employed in the optical recording layer of the present invention.

As for the structure of the organic dye compound having more excellent properties according to the present invention, it may be a structure having in its molecule a plurality of isomerizable structures or a plurality of associating structures.

FIG. 6 shows a general formula of a dyestuff having a plurality of isomerizable structures or a plurality of associating structures in its molecule. By the way, B, C and X in the formula may become identical with each other. A material having a plurality of tautomeric structures or a plurality of associating structures in its dye molecule is expected to exhibit improved properties especially as the optical recording layer 3 or as an optical information recording medium 1 or 20.

FIG. 7 shows a general formula of one example of the compound having a plurality of tautomeric structures or a plurality of associating structures in its dye molecule.

By the way, as for the preferable examples of the substituent groups to be provided by $R_1$, $R_2$, $R_3$ and $R_4$ in the formula, they include, as in the case of the compound shown in FIG. 3, halogen atom, nitro group, cyano group, hydroxyl group, mercapto group, carboxylic group, substituted or unsubstituted alkyl group, substituted or unsubstituted aralkyl group, substituted or unsubstituted amide group, substituted or unsubstituted aromatic ring group, substituted or unsubstituted alkoxy group, substituted or unsubstituted aralkyloxy group, substituted or unsubstituted aryloxy group, substituted or unsubstituted alkylthio group, substituted or unsubstituted aralkylthio group, substituted or unsubstituted arylthio group, substituted or unsubstituted amino group, substituted or unsubstituted acyl group, substituted or unsubstituted acyloxy group, substituted or unsubstituted alkoxycarbonyl group, substituted or unsubstituted aralkyloxycarbonyl group, substituted or unsubstituted aryloxycarbonyl group, substituted or unsubstituted alkenyloxycarbonyl group, substituted or unsubstituted aminocarbonyl group, substituted or unsubstituted alkenyl group, substituted or unsubstituted alkenyloxy group, substituted or unsubstituted alkenylthio group, substituted or unsubstituted heteroaryl group, substituted or unsubstituted heteroaryloxy group, substituted or unsubstituted heteroaryloxycarbonyl group, substituted or unsubstituted heteroarylthio group and substituted or unsubstituted metallocenyl group.

Among them, if the organic dyestuff has a substituent group consisting of amide group, preferably alkylamide, it may become more reactable by the light and heat to be provided by the laser beam, so that an isomer is more liable to be formed and that the organic dyestuff can be more easily orientated by the change in association thereof through an electrostatic action.

FIG. 8 shows a general formula of another example of the compound having a plurality of tautomeric structures or a plurality of associating structures in its dye molecule.

Figures 18, 19:
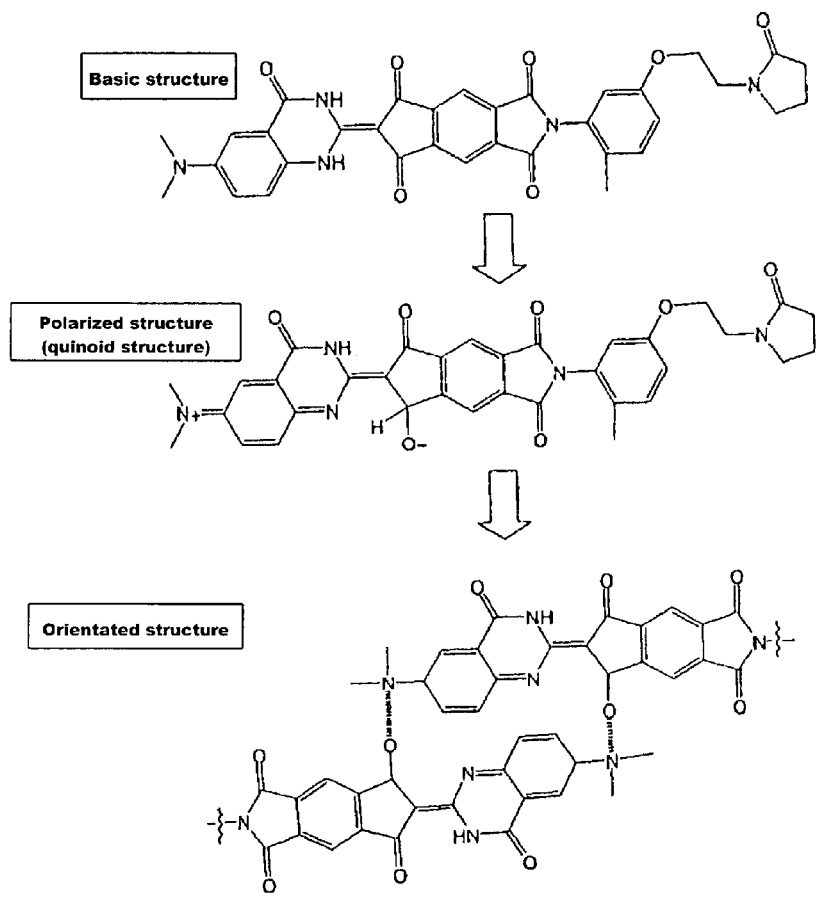
FIG. 18 is a diagram illustrating a process wherein the optical recording layer 3 containing an amine compound as one of the organic dye materials of the present invention changes from its basic structure to a polarized structure (quinoid structure) and then to an orientated structure.
FIG. 19 shows a table illustrating the refractive index "n", the extinction coefficient "k" and the modulation factor, before and after the recording, of various kinds of optical information recording mediums which were prepared in the same manner as one example by making use of each of the organic dye compounds represented by the general formula shown in FIG. 2.

FIG. 18 is a diagram illustrating a process wherein the optical recording layer 3 containing an amine compound changes from its basic structure to a polarized structure (quinoid structure) and then to an orientated structure. The optical recording layer 3 containing an amine compound having the aforementioned associating properties is designed to generate, as it is irradiated with laser beam, an unbalanced electric charge (polarization) in the dye molecule as the amine compound is reacted with light and heat, thereby creating an isomer as shown in FIG. 18.

Due to this unbalanced electric charge, a reversible change in structure of dyestuff is taken place at a portion of the recording layer which has been irradiated with the laser beam in distinction from a portion of the recording layer which has not been irradiated with the laser beam, thus providing a tautomeric change to the recording layer, thereby making it possible to perform the recording.

Further, if there is existed an amine compound having associating properties, an electrostatic interaction is permitted to take place due to this unbalanced electric charge. As a result, due to the association to be effected by this electrostatic interaction, a change in orientation is caused to occur in the recording layer, thereby making it possible to perform the recording.

Furthermore, if there is existed an amine compound having associating properties, the molecule of the dyestuff is optically excited by the irradiation of laser beam and hence this irradiated portion is caused to change into a quinoid-structure, thereby making it possible to perform the recording.

These states mentioned above can be confirmed, for example, by observing the absorption spectrums obtained before and after the recording. For example, when the absorption peak of absorption spectrum after the recording is found shifted to the long wavelength side as compared with the absorption spectrum of optical recording layer before the recording, it can be said that the isomerization or the change in orientation has taken place.

Further, whether or not the molecular composition (the kind and the number of atoms constituting the molecule) of an organic dye compound is retained without generating the decomposition of the organic dye compound can be confirmed by the analysis of the peak of each component by means of GC-MS system or a high-performance liquid chromatography for instance. For example, if the peaks obtained before and after the irradiation of laser beam are the same with each other, it can be that the molecular composition of an organic dye compound is retained without being decomposed.

Although representative methods to confirm the compositional state of an organic dye Compound have been discussed above, it is also possible to employ other confirmation methods.

Since the aforementioned amine compound having associating properties is liable to easily react with water or oxygen because of its nature, i.e. the associating properties thereof, the quinoid structure to be derived therefrom is very unstable so that it is required to take some measures to retain as much as possible the state of quinoid structure thus converted.

Therefore, in order to definitely retain the quinoid structure or stabilize the recorded portion, it may be advisable to incorporate various kinds of additives.

For example, a dehydration type additive such as carbodiimide may be suitably employed as such an additive. Further, a quencher may be mixed as a light stabilizer into the dye composition.

Further, in order to prevent the optical recording layer 3 from being deteriorated by water or oxygen, an auxiliary layer should preferably be deposited on one of the surfaces of the optical recording layer, which is opposite to the surface where the light-reflecting layer is to be formed, thereby preventing the penetration of water and oxygen into the optical recording layer.

More specifically, an oxidation inhibitor should preferably be incorporated into the optical recording layer 3, specific examples of the oxidation inhibitor comprising at least one kind of compound selected from the group consisting of a hindered amine (HALS)-based compound, a phenolic compound, an amine-based compound, a phosphate-based compound and an organosulfur-based compound.

Alternatively, an oxidation inhibiting film comprising any of these compounds may be disposed on one side of and close to the optical recording layer 3.

Further, the optical recording layer 3 may further comprise a rust preventive formed of a benzotriazole-based compound or a benzothiazole-based compound.

EXAMPLES

Next, the examples of the present invention will be explained together with comparative examples.

Examples

The amine compound shown in FIG. 4 was dissolved in TFP (tetrafluoropropanol: 2,2,3,3-tetrafluoro-1-propanol) to prepare a coating solution having a concentration of 18 g/L.

The organic dye compound having associating properties to be employed in the present invention is generally poor in solubility. It was found however that, when TFP (tetrafluoropropanol: 2,2,3,3-tetrafluoro-1-propanol) was employed as a solvent, it was possible to obtain an optical recording layer 3 which could be easily transformed into a quinoid structure through a change in association. By means of spin-coating method, this coating solution was then coated on the surface of a disc-like polycarbonate substrate 2 (120 mm in outer diameter, and 0.6 mm in thickness) having a continuous guiding groove (pre-groove 7) having a depth of 75 nm and a half width of 220 nm. Then, the resultant layer was dried for 30 minutes at a temperature of 80° C. to obtain the optical recording layer 3 having an average dye film thickness of 70 nm.

The guiding groove (pre-groove 7) was formed at a track pitch of about 400 nm. In order to suppress the expansion of the recording pit 10, this guiding groove should preferably be formed such that the width thereof is as wide as possible and the depth thereof is as shallow as possible. Specifically, the width of the guiding groove should preferably be confined within the range of 220-270 nm and the depth of the guiding groove should preferably be confined within the range of 55-80 nm. Further, the average film thickness of an optical recording layer 3 should preferably be confined within the range of 40-80 nm and the leveling value of the optical recording layer 3 should preferably be confined within the range of 0.35-0.45.

Then, silver (Ag) was sputtered onto the surface of this optical recording layer 3 to form a light-reflecting layer 4 having a thickness of 120 nm.

Furthermore, an ultraviolet curing resin (SD-318; Dainippon Ink Chemical Industries) was spin-coated on the surface of the light reflection layer 4 and irradiated with ultraviolet rays to cure the resin to form a protective layer 5.

An ultraviolet-curing resin adhesive was coated on the surface of this protective layer 5 and then a dummy substrate 6 formed of the same material and the same configuration (0.6 mm in thickness and 120 mm in outer diameter) as those of the substrate 2 was adhered on the surface of this protective layer 5. Subsequently, the adhesive was irradiated with ultraviolet rays to cure the adhesive, thus manufacturing a postscript type optical information recording medium 1.

Further, an optical information recording medium 1 was fabricated as a comparative example in the same manner as the aforementioned example except that the oxacyanine dye shown in FIG. 9 was employed.

FIG. 10 shows a table illustrating the results of assessment of recording properties of each of the aforementioned example and comparative example.

As apparent from FIG. 10, according to the example, it was possible to perform the recording with a recording power of about a half of that required in the comparative example. With respect to the reflectance and the modulation factor, values of almost the same level were obtained in both of these examples.

It will be recognized that SbER (Simulated bit Error Rate) which corresponds to jitter (jitter of signal) and PRSNR (Partial Response Signal to Noise Ratio) which corresponds to noise to regenerating signals were both deteriorated in the comparative example as compared with those of the example.

FIG. 11 shows a table illustrating the optical constants before and after the recording of a recording pit 10, i.e. a magnitude of the change "$\Delta k$" in refractive index "n" as well as in extinction coefficient "k" in the optical recording layer 3 of the disc employed in the example. It will be seen from the results shown in FIG. 1 that, as a result of the recording, the refractive index "n" was decreased and the extinction coefficient "k" was increased. This indicates that the portion of recording pit was thickened in color as compared with the unrecorded portion.

FIG. 12 is a graph illustrating the influence of the "$\Delta n$" and the "$\Delta k$" on the modulation factor (reflectance) in each of the discs which were fabricated in the same manner as the aforementioned example, wherein the film thickness of the optical information recording medium 1 created by making use of the dyestuff shown in FIG. 4 was variously changed. As shown in FIG. 12, as far as the contribution to the modulation factor is concerned, the "$\Delta k$" is greater than the "$\Delta n$" in contrast to that can be obtained from the conventional organic dyestuff.

It will be assumed from these results that about 80% of the modulation factor was derived from the effects of the "$\Delta k$".

Because of this reason, the recording can be suitably performed by the increase in magnitude of change "$\Delta k$" of extinction coefficient that can be derived from the recording rather than the increase in magnitude of change "Δn" of refractive index.

When calculated from the ratio of contribution to be obtained from FIG. 12, if it is desired to achieve a modulation factor of up to 0.45 for instance, the "Δn" is required to be 0.052 (an increase of 94%), whereas the "Δk" is required to be 0.009 (an increase of 22%). More specifically, Δn=0.335 or Δk=0.055 is required.

FIG. 13 is a graph illustrating the change of reflectance relative to the refractive index "n". When it is desired to obtain a sufficient modulation factor (for example, a standard value of 0.35) by making use of only the refractive index "n", it is required to realize a change of about 1.55-1.9 as the range of change in refractive index as shown by the dot-and-dash line shown in FIG. 13. As a matter of fact however, as shown in the graph of FIG. 11; a change of only 0.055 was permitted as the "Δn" and hence the value of this change is confined to a very narrow region (as indicated in FIG. 13 by a two dots-and-dash line) as shown in FIG. 13, thus making it impossible to obtain a sufficient change in reflectance.

Figure 14:
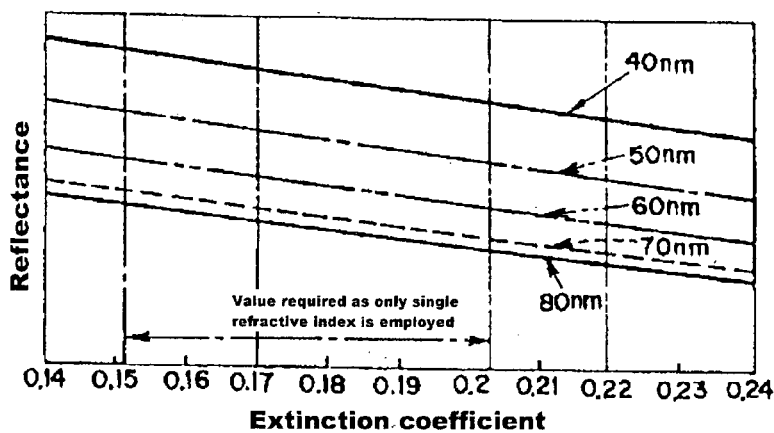
FIG. 14 is a graph illustrating the change of reflectance relative to the extinction coefficient "k"

FIG. 14 is a graph illustrating the change of reflectance relative to the extinction coefficient "k". When it is desired to obtain a sufficient modulation factor (for example, 0.35) by making use of only the extinction coefficient "k", it is required to realize a change of about 0.15-0.22 as the range of change in extinction coefficient "k" as shown by the dot-and-dash line shown in FIG. 14. As a matter of fact however, as shown in the graph of FIG. 11, a change of 0.05 was permitted as the "Δk" and hence this change indicates a value of a very wide region (as indicated in FIG. 13 by a two dots-and-dash line) as shown in FIG. 13 in contrast to the case of refractive index "n", thus making it possible to obtain a sufficient change in reflectance by making use of only the "Δk".

In FIG. 14, the range of value required (as the range of Δk) for the recording by making use of only the "Δk" (shown by the dot-and-dash line shown in FIG. 14) is shifted to a smaller value than the actual range of change (shown by the two dots-and-dash line in FIG. 14). The reason for this is that, as a tendency of the change of reflectance relative to the "Δk", the rising gradient of reflectance tends to become higher as the "Δk" becomes smaller, so that the range of value required for the recording by making use of only the "Δk" is shown therein as a preferable range. In practical use, the range of "Δk" may be set to any optional zone.

FIG. 19 shows a table illustrating the refractive index "n", the extinction coefficient "k" and the modulation factor, before and after the recording, of various kinds of optical information recording mediums which were prepared in the same manner as the aforementioned example by making use of each of the organic dye compounds represented by the general formula shown in FIG. 2. In FIG. 19, the existence or absence of ferrocene group as indicated in the organic dye compound shown in FIG. 5 is indicated in each of the organic dye compounds.

Figure 20:
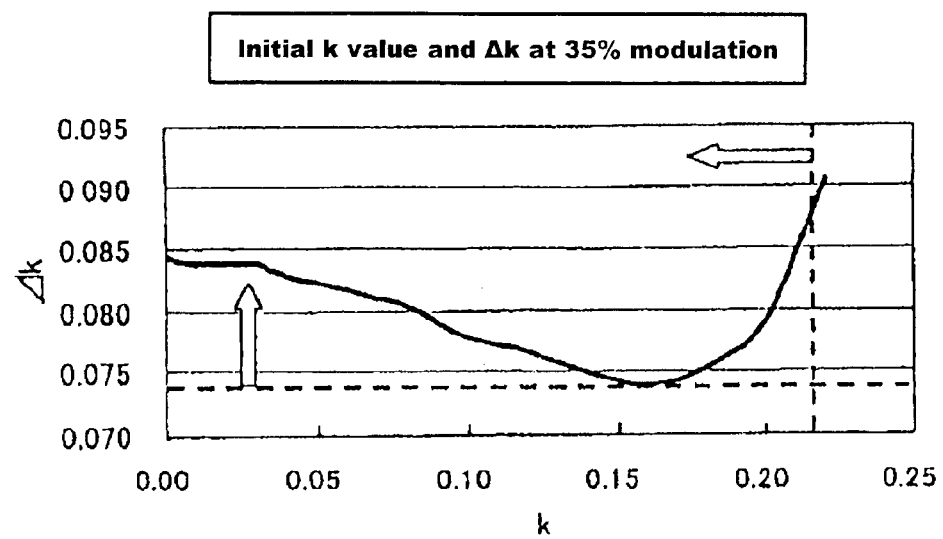
FIG. 20 is a graph illustrating the ranges of the extinction coefficient "k" and of the change "Δk" of the extinction coefficient "k" which were required for satisfying the modulation factor of not less than 35% as stipulated by the standard, these results being obtained using various kinds of optical information recording mediums which were prepared in the same manner as one example by making use of each of the organic dye compounds represented by the general formula shown in FIG. 2.

FIG. 20 is a graph illustrating the ranges of the extinction coefficient "k" and of the change "Δk" of the extinction coefficient "k" which were required for satisfying the modulation factor of not less than 35% as stipulated by the standard, these results being obtained using various kinds of optical information recording mediums which were prepared in the same manner as the aforementioned example by making use of each of the organic dye compounds represented by the general formula shown in FIG. 2.

With respect to the change of refractive index "n" and the change of extinction coefficient "k" before and after the recording according to the present invention, it will be recognized that the refractive index "n" falling within the range of 1.7 to 1.9 before the recording was caused to change by only a magnitude of at most 0.1 or less than 0.1 after the recording as shown in FIG. 19. Whereas, the extinction coefficient "k" which was 0.22 before the recording was caused to change by a magnitude of not less than 0.074 after the recording as shown in FIG. 20.

With regard to the range of extinction coefficient "k" (0.22 or less) which is indicated by an arrow in FIG. 20 and the range of change "Δk" (0.074 or more), they were derived, as described above, as the conditions for securing not less than 35% as a standard value of modulation factor in the optical information recording medium of the present invention.

By the way, it is preferable to take the error of measurement into consideration in evaluating the aforementioned results. Namely, it is preferable to take into account a measuring error of ±5%-±10% with respect to the values obtained in the measurement. In that case, the refractive index "n" falling within the range of 1.5 to 2.0 before the recording may be caused to change by 10% or less (the result obtained is re-calculated according to the ratio) after the recording, and the extinction coefficient "k" which has been 0.25 or less before the recording may be caused to change by 30% or more (the result obtained is re-calculated according to the ratio) after the recording.

By the way, the present invention has been accomplished expecting the change of reflectance that can be derived from the change of the extinction coefficient "k" and also expecting a synergistic effect of the change of reflectance that can be derived from the change of the extinction coefficient "k" and also from the change of the refractive index "n" as the dye compounds represented by the chemical structures shown in FIGS. 2 and 6 or by the chemical structures shown in FIGS. 3 to 5 and FIGS. 7 and 8 are employed as a dyestuff of the optical recording layer. Further, the present invention has been accomplished expecting the change of reflectance that can be brought about by the change of the extinction coefficient "k", preferably, by an increase of the extinction coefficient "k". Further, when a dyestuff which is also capable of greatly changing (decreasing) the refractive index "n" is employed, it is possible to obtain further preferable optical properties. In this case however, it is more preferable if these changes can be caused to generate without inviting the decomposition of the dyestuff.

What is claimed is:

1. An optical information recording medium comprising:
    a light-transmitting substrate with trenches in the surface; and
    an optical recording layer containing a light-absorbing substance constituted by a dyestuff which is capable of absorbing laser beam,
    wherein an optically readable information is recorded in the optical recording layer through an irradiation of the laser beam onto the optical recording layer and by taking advantage of the discoloration of the dyestuff while retaining the molecular composition of the dyestuff, said dyestuff having the following chemical formula (2):

chemical formula (2)

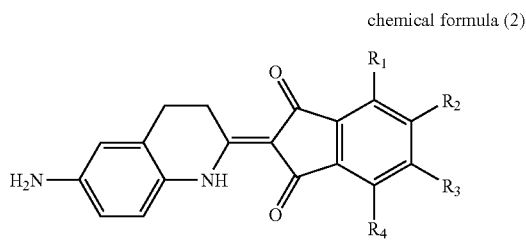

wherein $R_1$, $R_2$, $R_3$, and $R_4$ are individually a hydrogen atom or a substituent group.

2. The optical information recording medium according to claim 1, wherein the optically readable information is recorded in the optical recording layer by taking advantage of the change in extinction coefficient of the dyestuff.

3. The optical information recording medium according to claim 2, wherein the dyestuff is selected from those which are capable of being isomerized as a result of the irradiation of laser beam thereto.

4. The optical information recording medium according to claim 2, wherein the extinction coefficient is designed to be increased as a result of the irradiation of laser beam thereto as compared with that before the irradiation of laser beam.

5. The optical information recording medium according to claim 2, wherein a wavelength on the long wavelength side of the absorption peak of the absorption spectrum of the dyestuff to the laser beam is employed as a recording wavelength and the recording is performed through the change of extinction coefficient of the dyestuff relative to the recording wavelength.

6. The optical information recording medium according to claim 5, wherein the change of refractive index of the dyestuff relative to the recording wavelength is combined with the change of the extinction coefficient, thereby making it possible to perform the recording by making use of these changes.

7. The optical information recording medium according to claim 6, wherein the refractive index of the dyestuff is confined to the range of 1.5 to 2.0 before the recording.

8. The optical information recording medium according to claim 6, wherein the refractive index of the dyestuff is enabled to change at a ratio of not more than 10% as a result of the recording as compared with that before the recording.

9. The optical information recording medium according to claim 5, wherein the recording wavelength is confined within the range of 350 nm to 500 nm.

10. The optical information recording medium according to claim 9, wherein the recording wavelength is confined to 405 nm.

11. The optical information recording medium according to claim 2, wherein the extinction coefficient of the dyestuff is 0.25 or less before the recording.

12. The optical information recording medium according to claim 2, wherein the extinction coefficient of the dyestuff is enabled to change at a ratio of not less than 30% as a result of the recording as compared with that before the recording.

13. The optical information recording medium according to claim 1, wherein the dyestuff is designed to be thickened in color as a result of the irradiation of laser beam thereto as compared with that before the irradiation of laser beam.

14. The optical information recording medium according to claim 1, wherein the optical recording layer is enabled to form an isomer due to the light created by an irradiation of the laser beam thereto and due to the heat generated by the absorption of the laser beam, thereby enabling to perform the recording of the information.

15. The optical information recording medium according to claim 14, wherein the isomer is enabled to form a polarized structure which is unbalanced in electric charge as it is irradiated with the laser beam, this polarized structure being designed to be orientated by an electrostatic interaction, thereby making it possible to record the information.

16. The optical information recording medium according to claim 15, wherein the dyestuff is enabled to change in extinction coefficient as the polarized structure is orientated.

17. The optical information recording medium according to claim 1, wherein the optical recording layer is enabled to record the information at a wavelength ranging from 350 to 500 nm and the dyestuff is an organic dye compound having reversible optical properties.

18. The optical information recording medium according to claim 1, wherein the dyestuff comprises a compound which is capable of changing the absorption peak to the long wavelength side as a result of the recording.

19. The optical information recording medium according to claim 1, which further comprises a light-reflecting layer which is capable of reflecting the laser beam.

20. The optical information recording medium according to claim 1, wherein the dyestuff is an organic dye and an oxidation preventive layer is disposed on one side of and close to the optical recording layer, the oxidation preventive layer containing at least one compound selected from the group consisting of a hindered amine (HALS)-based compound, a phenolic compound, an amine-based compound, a phosphate-based compound and an organosulfur-based compound.

21. The optical information recording medium according to claim 1, wherein the optical recording layer contain an oxidation preventing agent comprising at least one compound selected from the group consisting of hindered amine (HALS)-based compound, a phenolic compound, an amine-based compound, a phosphate-based compound and an organosulfur-based compound.

22. The optical information recording medium according to claim 1, wherein the optical recording layer contains a rust preventive formed of a benzotriazole-based compound or a benzothiazole-based compound.

23. The optical information recording medium according to claim 1, wherein the substrate is provided with trenches about 400 nm in track pitch, each trench having a width of about 220-270 nm and a depth of about 55-80 nm.

24. An optical information recording medium comprising:
a light-transmitting substrate; and
an optical recording layer containing a light-absorbing substance constituted by a dyestuff which is capable of absorbing laser beam,
wherein an optically readable information is recorded through an irradiation of the laser beam onto the optical recording layer and by taking advantage of the discoloration of the dyestuff while retaining the molecular composition of the dyestuff, wherein said dyestuff is a dye compound represented by the following chemical formula (3):

chemical formula (3)

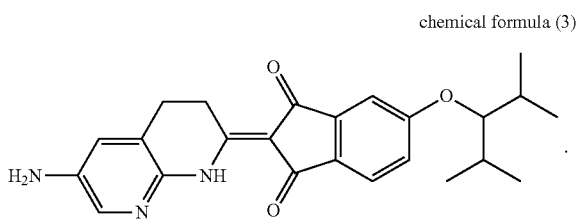

25. An optical information recording medium comprising:
a light-transmitting substrate; and
an optical recording layer containing a light-absorbing substance constituted by a dyestuff which is capable of absorbing laser beam,
wherein an optically readable information is recorded through an irradiation of the laser beam onto the optical recording layer and by taking advantage of the discoloration of the dyestuff while retaining the molecular composition of the dyestuff, wherein said dyestuff is a dye compound represented by the following chemical formula (4):

chemical formula (4)

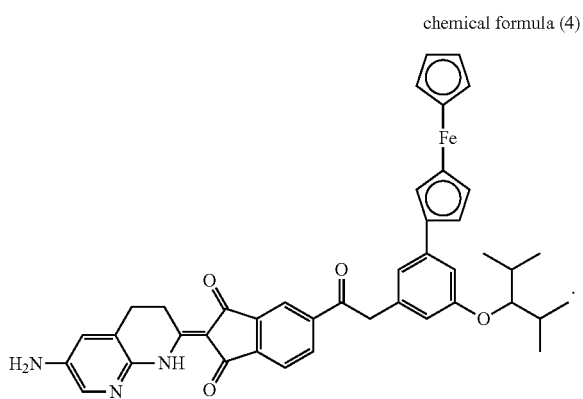

26. An optical information recording medium comprising:
a light-transmitting substrate; and
an optical recording layer containing a light-absorbing substance constituted by a dyestuff which is capable of absorbing laser beam,
wherein an optically readable information is recorded in the optical recording layer through an irradiation of the laser beam onto the optical recording layer and by taking advantage of the discoloration of the dyestuff while retaining the molecular composition of the dyestuff, the optical information recording medium being characterized in that a dye compound represented by the following chemical structure (5) is employed as the dyestuff:

chemical formula (5)

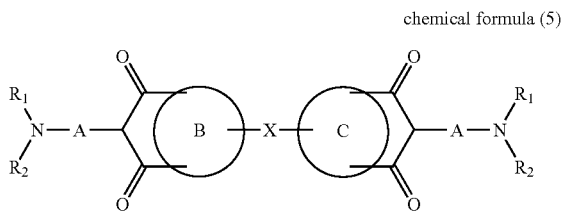

wherein "A" is a substituted or unsubstituted aryl group or a heterocyclic group; $R_1$, $R_2$, $R_3$ and $R_4$ are individually a hydrogen atom, a substituted or unsubstituted alkyl group, a substituted or unsubstituted aralkyl group, or a substituted or unsubstituted aryl group; "B" and "C" are individually a residue of aromatic ring; and "X" is a substituted or unsubstituted linking group.

27. The optical information recording medium according to claim 26, wherein the dye compound represented by the chemical formula (5) is a dye compound represented by the following chemical formula (6):

chemical formula (6)

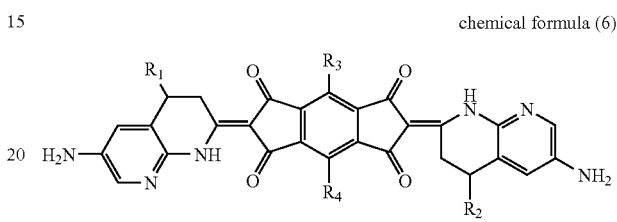

wherein $R_1$, $R_2$, $R_3$ and $R_4$ are individually hydrogen atom or a substituent group.

28. The optical information recording medium according to claim 26, wherein the dye compound represented by the chemical formula (5) is a dye compound represented by the following chemical formula (7):

chemical formula (7)

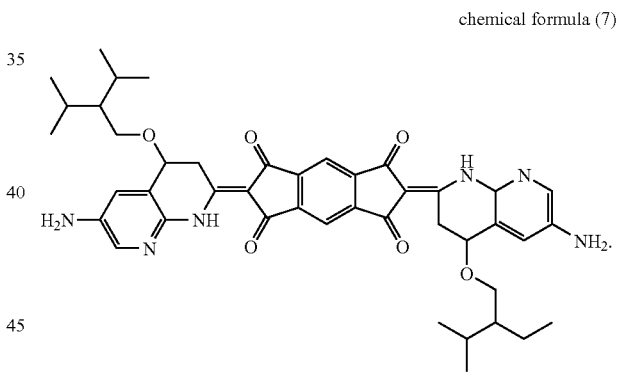

29. A recording method of optical information recording medium according to any one of claim 1, 24, or 26,
the recording method being featured in that a wavelength on the long wavelength side of the absorption peak of the absorption spectrum of the dyestuff to the laser beam is employed as a recording wavelength and that the recording is performed through the change of extinction coefficient of the dyestuff relative to the recording wavelength.

30. The recording method according to claim 29, wherein the recording wavelength is confined within the range of 350 nm to 500 nm.

31. The recording method according to claim 29, wherein the recording wavelength is confined to 405 nm.

* * * * *